(12) United States Patent
Lin

(10) Patent No.: US 10,241,506 B2
(45) Date of Patent: Mar. 26, 2019

(54) PASSENGER TRANSPORTATION COMPLEX PARENT-SUBSIDIARY MOBILE CARRIER

(71) Applicant: Chen-Hsin Lin, New Taipei (TW)

(72) Inventor: Chen-Hsin Lin, New Taipei (TW)

( * ) Notice: Subject to any disclaimer, the term of this patent is extended or adjusted under 35 U.S.C. 154(b) by 0 days.

(21) Appl. No.: 16/146,026

(22) Filed: Sep. 28, 2018

(65) Prior Publication Data
US 2019/0033857 A1    Jan. 31, 2019

Related U.S. Application Data

(63) Continuation-in-part of application No. 15/059,613, filed on Mar. 3, 2016.

(51) Int. Cl.
| | |
|---|---|
| *B60P 3/42* | (2006.01) |
| *B63B 7/00* | (2006.01) |
| *B63B 7/04* | (2006.01) |
| *G05D 1/00* | (2006.01) |
| *G05D 1/02* | (2006.01) |
| *G05D 1/08* | (2006.01) |
| *H04W 4/70* | (2018.01) |

(52) U.S. Cl.
CPC .............. *G05D 1/0027* (2013.01); *B60P 3/42* (2013.01); *B63B 7/04* (2013.01); *B63B 2007/006* (2013.01); *G05D 1/0022* (2013.01); *G05D 1/0202* (2013.01); *G05D 1/0206* (2013.01); *G05D 1/0278* (2013.01); *G05D 1/0289* (2013.01); *G05D 1/0866* (2013.01); *H04W 4/70* (2018.02)

(58) Field of Classification Search
CPC . B60P 3/42; B62D 53/005; B63B 7/04; B64C 37/02; G05D 1/0022; G05D 1/0202; G05D 1/0206; G05D 1/021; G05D 1/0289; H04W 4/005; H04W 4/02
USPC ............................................................ 701/2
See application file for complete search history.

*Primary Examiner* — Maceeh Anwari
(74) *Attorney, Agent, or Firm* — Rosenberg, Klein & Lee

(57) ABSTRACT

A passenger transportation complex parent-subsidiary mobile carrier includes a parent carrier and at least one subsidiary carrier. The parent carrier has a parent carrying section. The subsidiary carrier has a subsidiary carrying section. The parent carrier includes a first connection section and the subsidiary carrier includes a second connection section releasably mated and connected with the first connection section. At least a part of the parent carrying section and at least a part of the subsidiary carrying section are mated and connected with each other and positioned on the same plane so that the parent carrier and the subsidiary carrier are connected to together form the complex carrier as an integrated assembly to move together or separate from each other to respectively move.

20 Claims, 12 Drawing Sheets

PASSENGER TRANSPORTATION COMPLEX PARENT-SUBSIDIARY MOBILE CARRIER

CROSS-REFERENCE TO RELATED APPLICATION

This application is a continuation-in-part application of U.S. patent application Ser. No. 15/059,613, currently pending.

BACKGROUND OF THE INVENTION

1. Field of the Invention

The present invention relates generally to a transportation tool, and more particularly to a passenger transportation complex parent-subsidiary mobile carrier. The complex parent-subsidiary mobile carrier includes a parent carrier and at least one subsidiary carrier. The parent carrier and the subsidiary carrier can be combined (into an integrated assembly) and/or separate from each other to respectively operate and run.

2. Description of the Related Art

It is known that the current transportation tools including water mobiles (such as ships and boats), land mobiles (such as vehicles) and aircrafts (such as airplanes) are mainly used to transport passengers, transfer cargoes and provide leisure and sightseeing effects. In order to make the traffic or transportation tools multiuse, a technique that a small-scale transportation tool is carried in a large-scale transportation tool has been developed. For example, a vehicle, an airplane or a small-size boat is carried on a ship. In use, a driver can drive the vehicle, the airplane or the small-size boat to separate from the ship. After the vehicle, the airplane or the small-size boat is separated from the ship, they can independently run. Moreover, after separated from the ship, the vehicle, the airplane or the small-size boat can be used to achieve other usage independent from the ship.

There is a conventional remote control transportation tool applied to military field. For example, US 2009/0079839 A1 discloses a typical embodiment. The embodiment discloses that multiple remotely controllable independent vehicles, which are combined into an armored vehicle fleet system. The embodiment includes at least one leading vehicle and multiple follower vehicles. Commands and verification messages are transmitted between the vehicles to co-execute the missions so as to reduce the number of drivers and lower the training cost.

However, as well known by those who are skilled in this field, the independent leading vehicle and follower vehicles cannot be mated and connected with each other to form an integrated large-scale armored vehicle fleet.

A kind of conventional remote control unmanned parent-subsidiary carrier system is also disclosed for exploration and searching, etc. The unmanned parent-subsidiary carrier system includes a parent ship and at least one subsidiary ship, which together form a submarine cruising system. Both the parent ship and the subsidiary ship have electronic (communication) modules, sensation receiving modules and impelling devices and can be remotely controlled to cruise. In addition, the parent ship is equipped with a mating section, while the subsidiary ship is equipped with a connection section or mating rail. In cooperation with the mating sensors and under the guide of the mating correction emitter of the parent ship, the subsidiary ship can be connected under the bottom of the parent ship.

The above embodiment has some shortcomings in structure and application. For example, both the parent ship and the subsidiary ship cannot be operated and driven by a driver and the move of the parent ship and the subsidiary ship can be controlled only by means of remote control device. Moreover, the independent parent ship and subsidiary ship cannot be mated and connected with each other to form an "integrated" large-scale ship body.

To speak representatively, the above reveals some shortcomings existing in the structure design, application and actual use of the conventional unmanned mobile carrier system in cooperation with the remote control module. In case the structure of the mobile carrier or the relevant device is redesigned to be different from the conventional structure, the use form of the mobile carrier can be changed to practically establish a more idealistic operation and assembling system. For example, both the parent ship and the subsidiary ship can be operated and driven by a driver to achieve leisure and sightseeing effect. Also, the parent ship and the subsidiary ship can be separated from each other as two independent traffic or transportation tools or mated and connected with each other to forma large-scale mobile carrier (or so-called integrated assembly). All these are not specifically taught or disclosed in the above embodiment.

SUMMARY OF THE INVENTION

It is therefore a primary object of the present invention to provide a passenger transportation complex parent-subsidiary mobile carrier. The complex parent-subsidiary mobile carrier can be manned or unmanned and remotely controlled. The complex parent-subsidiary mobile carrier includes a parent carrier and at least one subsidiary carrier. The parent carrier and the subsidiary carrier can be integrally combined to move together. Alternatively, the parent carrier and the subsidiary carrier can be separated to respectively back and forth move by means of remote control or dragging. Accordingly, the transportation tool can be used in a combined mode and a separated mode. Therefore, the parent carrier and the subsidiary carrier can respectively run and back and forth run by dragging and remote control. Under such circumstance, the form and the space of the transportation tool are more diversified to widen the application range of the transportation tool and enhance the convenience and utility thereof in use.

To achieve the above and other objects, the passenger transportation complex parent-subsidiary mobile carrier of the present invention provides passenger transportation effect and can run and operate in a combined mode/separated mode. The complex carrier includes a parent carrier and at least one subsidiary carrier. The parent carrier has a parent carrying section and a profile line surrounding and connecting with the parent carrying section. The subsidiary carrier has a subsidiary carrying section and a profile line surrounding and connecting with the subsidiary carrying section. The parent carrier is defined with at least one reference axis. The subsidiary carrier is defined with a central reference axis. At least one of the parent carrier and the subsidiary carrier has a passenger transportation section (or chamber) and is self-movable and includes a power control unit capable of controlling moving speed and direction. The parent carrier includes a first connection section and the subsidiary carrier includes a second connection section. The second connection section can be mated and connected with and/or released from the first connection section. The reference axis of the parent carrier is aligned with and connected with the central reference axis of the subsidiary carrier so that at least a part of the profile line of the parent carrier is mated and connected with at least a part of the profile line of the subsidiary carrier, whereby at least a part of the parent carrying section and at least a part of the subsidiary carrying section are mated and connected with each other and positioned on the same plane so that the passenger transportation section (or chamber) of the parent carrier is in communication with or not in communication with the passenger transportation section (or chamber) of the subsidiary carrier. Therefore, the use of the space and the product function of the parent carrier and the subsidiary carrier can be more diversified for the driver and the passengers. The parent carrier and the subsidiary carrier can be connected to together form the complex carrier as an integrated assembly to move together or separate from each other to respectively move.

In the above passenger transportation complex parent-subsidiary mobile carrier, the assembly includes a remote control unit for transmitting/receiving remote control signals to remotely control the power control unit. The power control unit has a main power control unit disposed on the parent carrier for controlling the moving speed and direction of the parent carrier. The remote control unit is disposed on the subsidiary carrier for transmitting/receiving remote control signals to remotely control the main power control unit. Accordingly, in the condition that the parent carrier and the subsidiary carrier are connected with each other, the remote control unit on the subsidiary carrier can be used to remotely control the main power control unit of the parent carrier. In this case, the subsidiary carrier can be driven by the parent carrier to move together with the parent carrier. In addition, in the condition that the subsidiary carrier is separated from the parent carrier, the subsidiary carrier can solely run and move. Alternatively, the remote control unit on the subsidiary carrier can be used to remotely control the main power control unit to drive the parent carrier to solely run and move. The subsidiary carrier can move along with the parent carrier. Accordingly, the passenger transportation complex parent-subsidiary mobile carrier can be combined into an integrated assembly or separated from each other to respectively operate and back and forth move by means of remote control.

Alternatively, the power control unit has a subsidiary power control unit disposed on the subsidiary carrier for controlling the moving speed and direction of the subsidiary carrier. The remote control unit is disposed on the parent carrier for transmitting/receiving remote control signals to remotely control the subsidiary power control unit.

In the above passenger transportation complex parent-subsidiary mobile carrier, the power control unit and the remote control unit are respectively electrically connected to signal transmitting/receiving units. The signal transmitting/receiving units serve to transmit the remote control signals by means of at least one of wired, wireless and GPS navigation systems.

In the above passenger transportation complex parent-subsidiary mobile carrier, the parent carrier is connected to the subsidiary carrier via a dragging member for dragging the subsidiary carrier. Accordingly, in the condition that the subsidiary carrier is separated from the parent carrier, the subsidiary carrier can be dragged by the parent carrier to move along with the parent carrier.

The passenger transportation complex carrier is selected from a group consisting of water mobile, land mobile and aircraft. The water mobiles can be ships, speedboats, inflatable rubber boats, hovercraft, etc. The land mobiles can be automobiles, motorbikes, trains, trams, tractors, tanks, etc. The aircrafts can be airplanes, helicopters, airships, hot-air balloons, etc.

The present invention can be best understood through the following description and accompanying drawings, wherein:

DETAILED DESCRIPTION OF THE PREFERRED EMBODIMENTS

Figure 1:
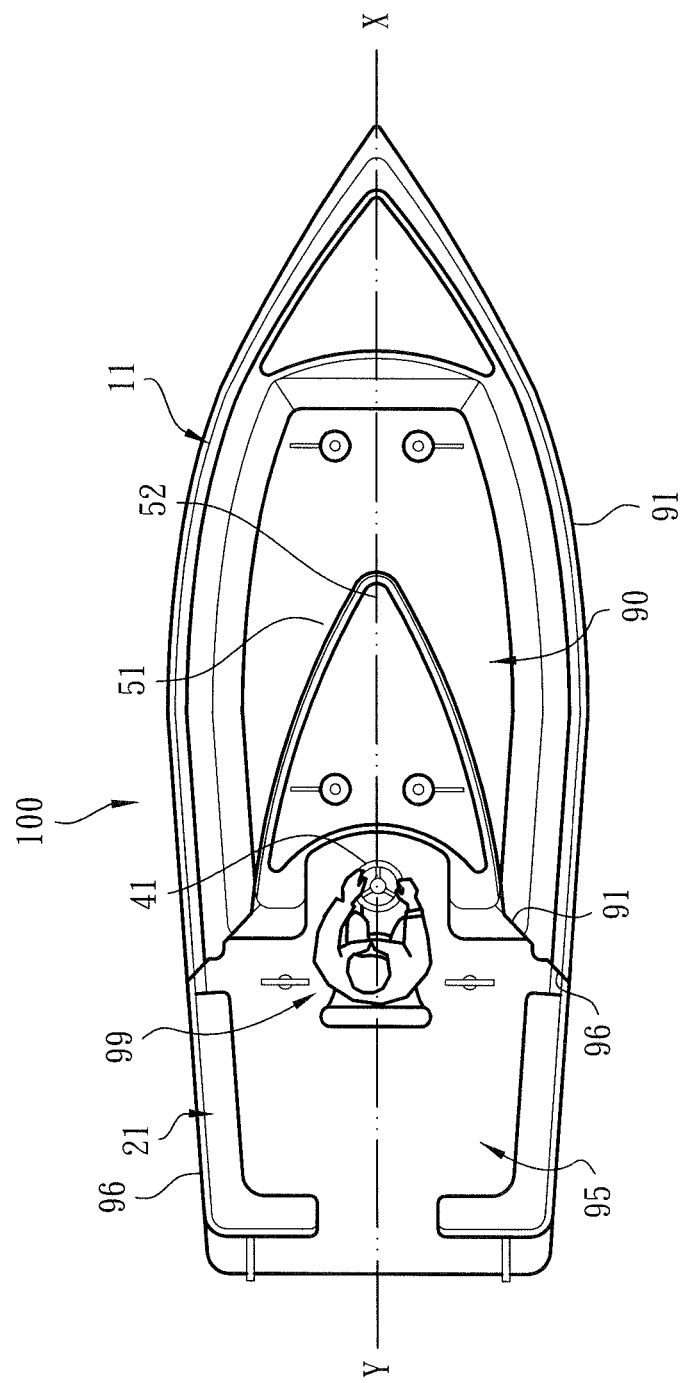
FIG. 1 is a top view of a first embodiment of the present invention.
Figure 2:
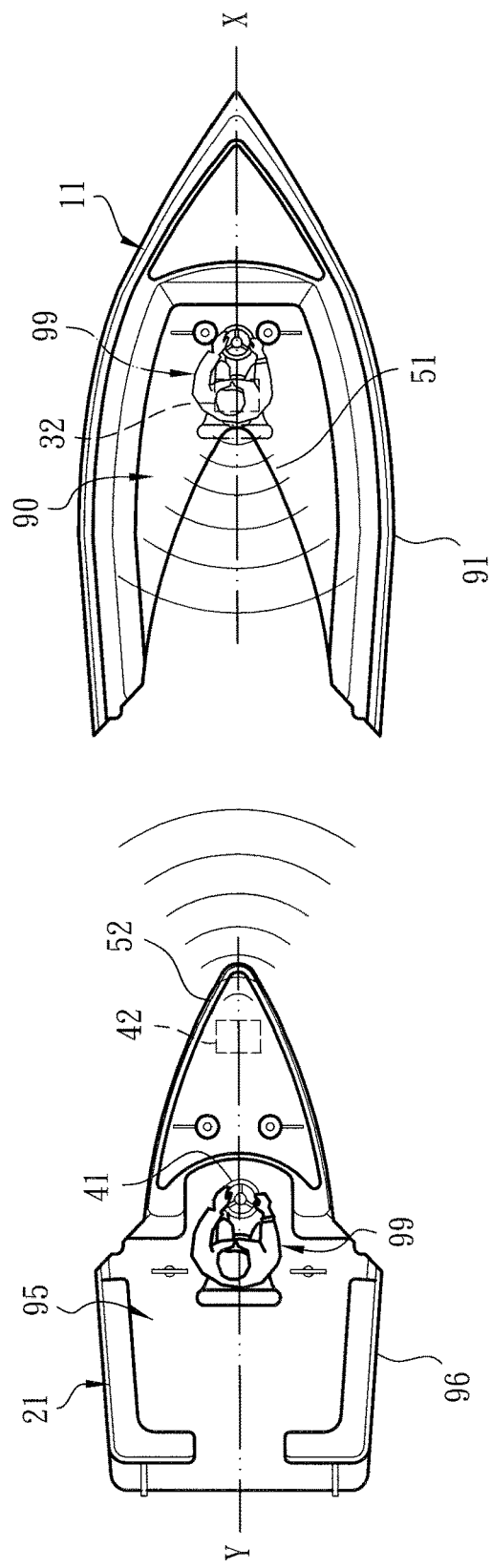
FIG. 2 is a top view of the first embodiment of the present invention according to FIG. 1, showing a using state thereof.

Please refer to FIGS. 1 and 2. According to a first embodiment, the passenger transportation complex parent-subsidiary mobile carrier of the present invention includes a parent carrier 11 and at least one subsidiary carrier 21. The parent carrier 11 and the subsidiary carrier 21 can be both water mobiles, land mobiles or aircrafts. The water mobiles can be ships, speedboats, inflatable rubber boats, hovercraft, submarines, etc. The land mobiles can be automobiles, motorbikes, trains, trams, tractors, tanks, etc. The aircrafts can be airplanes, helicopters, airships, hot-air balloons, etc.

In this embodiment, the parent carrier 11 and the subsidiary carrier 21 are both speedboats providing a passenger transportation section (or chamber) 99 for carrying passengers and/or for a driver to drive and operate the speedboats. The parent carrier 11 is self-movable. The parent carrier 11 is defined with at least one reference axis X and has at least one first connection section 51. As shown in the drawings, the reference axis X is positioned in a central section of the parent carrier 11. A central section of the first connection section 51 is positioned on the reference axis X.

It should be noted that the parent carrier 11 can be alternatively defined with multiple reference axes X corresponding to multiple first connection sections 51.

As shown in FIGS. 1 and 2, the subsidiary carrier 21 is defined with a central reference axis Y. The subsidiary carrier 21 includes a second connection section 52 disposed on the subsidiary carrier 21 and releasably mated and connected with the first connection section 51. The central section of the second connection section 52 is positioned on the central reference axis Y.

That is, when the first connection section 51 is mated and connected with and/or released from the second connection section 52, the reference axis X of the parent carrier 11 is aligned with and connected with the central reference axis Y of the subsidiary carrier 21 so that the parent carrier 11 and the subsidiary carrier 21 are connected into the complex carrier as an integrated assembly 100 to move together. Alternatively, the parent carrier 11 and the subsidiary carrier 21 can be separated from each other to move respectively.

In this embodiment, the parent carrier 11 has a parent carrying section 90 and a profile line 91 surrounding and connecting with the parent carrying section 90 (and the first connection section 51 is connectable with the profile line 91 of the parent carrier 11). The subsidiary carrier 21 has a subsidiary carrying section 95 and a profile line 96 surrounding and connecting with the subsidiary carrying section 95 (and the second connection section 52 is connectable with the profile line 96 of the subsidiary carrier 21).

When the reference axis X of the parent carrier 11 is aligned with and connected with the central reference axis Y of the subsidiary carrier 21 to together form the integrated assembly 100, at least a part of the profile line 91 of the parent carrier 11 is mated and connected with at least a part of the profile line 96 of the subsidiary carrier 21, whereby at least a part of the parent carrying section 90 and at least a part of the subsidiary carrying section 95 are mated and connected with each other and positioned on the same plane. In addition, the passenger transportation section (or chamber) 99 of the parent carrier 11 is in communication with or not in communication with the passenger transportation section (or chamber) 99 of the subsidiary carrier 21. In this case, the use of the space and the product function of the parent carrier 11 and the subsidiary carrier 21 can be more diversified for the driver and the passengers.

With reference to FIGS. 1 and 2, in the condition that the reference axis X of the parent carrier 11 is aligned with and connected with the central reference axis Y of the subsidiary carrier 21, the area of the (connected) parent carrier 11 and subsidiary carrier 21, (that is, the area of the assembly 100 or the connection area of the parent carrying section 90 and the subsidiary carrying section 95) is larger than the area of the parent carrier 11 (the parent carrying section 90). Also, the area of the parent carrier 11 (the parent carrying section 90) is larger than, equal to or smaller than the area of the subsidiary carrier 21 (the subsidiary carrying section 95).

Figure 3:
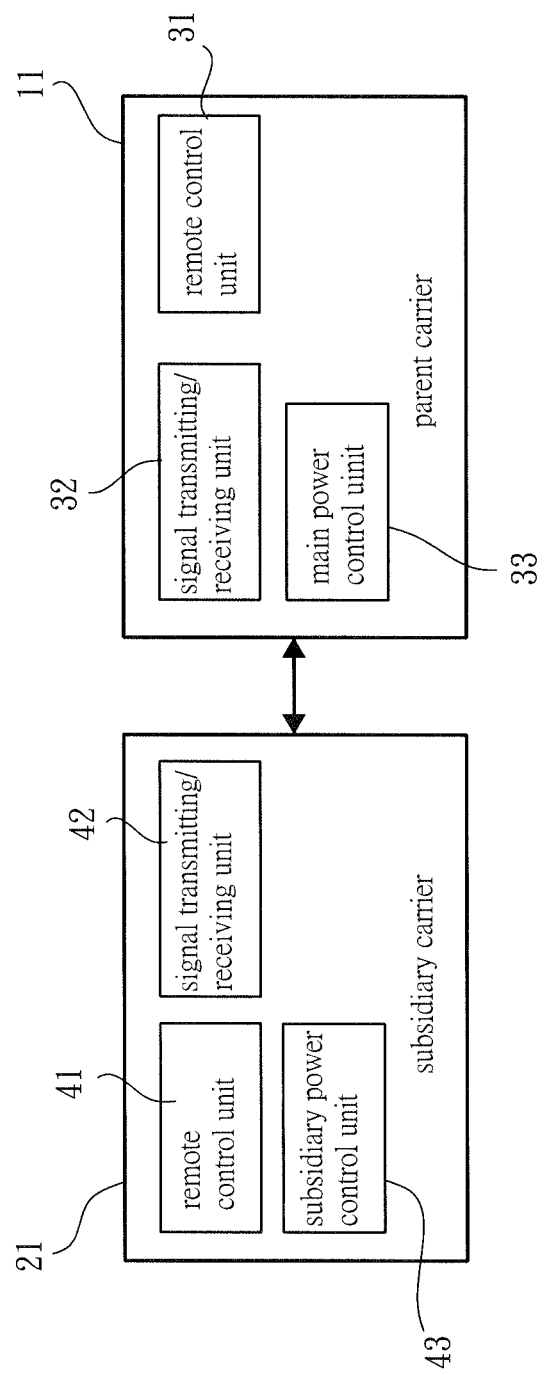
FIG. 3 is a block diagram of the present invention, showing the function thereof.

Please refer to FIG. 3. The complex carrier or assembly 100 is equipped with a power control unit capable of controlling the moving speed and direction of the parent carrier 11 and/or the subsidiary carrier 21 and a remote control unit for transmitting/receiving signals to remotely control the power control unit. The power control unit and the remote control unit are respectively electrically connected to signal transmitting/receiving units.

In a preferred embodiment, the power control unit has a main power control unit 33 disposed on the parent carrier 11 (and/or a subsidiary power control unit 43 disposed on the subsidiary carrier 21) for controlling the moving speed and direction of the parent carrier 11 (and/or the subsidiary carrier 21). The main power control unit 33 (and/or the subsidiary power control unit 43) is electrically connected to the signal transmitting/receiving unit (or the signal transmitting/receiving unit 42). The first connection section 51 can be disposed at rear end of the parent carrier 11. A remote control unit 41 is disposed on the subsidiary carrier 21 (or a remote control unit 31 is disposed on the parent carrier 11) for outputting remote control signals to remotely control the main power control unit 33. The remote control unit 41 of the subsidiary carrier 21 can be electrically connected to the signal transmitting/receiving unit 42. The second connection section 52 can be disposed at front end of the subsidiary carrier 21.

As shown in FIG. 1, the first connection section 51 of the parent carrier 11 is mated and connected with the second connection section 52 of the subsidiary carrier 21, whereby the parent carrier 11 (or the parent carrying section 90) and the subsidiary carrier 21 (or the subsidiary carrying section 95) can be connected with each other to form an "integrated" larger boat body structure. Accordingly, in the condition that the parent carrier 11 and the subsidiary carrier 21 are connected with each other, a person and/or a driver can selectively sit on the subsidiary carrier 21 (or the parent carrier 11) and use the remote control unit 41 on the subsidiary carrier 21 to remotely control the main power control unit 33 of the parent carrier 11. In this case, by means of the self-moving ability of the main power control unit 33 of the parent carrier 11, the subsidiary carrier 21 can be driven to run together with the parent carrier 11.

As shown in FIG. 2, in use, according to requirements, the first connection section 51 of the parent carrier 11 can be separated from the second connection section 52 of the subsidiary carrier 21. Under such circumstance, the parent carrier 11 and the subsidiary carrier 21 can be separated from each other to independently move. As shown by the phantom lines of FIG. 2, the person and/or the driver can sit on the parent carrier 11. In the condition that the parent carrier 11 and the subsidiary carrier 21 are separated from each other, a driver can respectively control the parent carrier 11 or the subsidiary carrier 21 to self-move. Alternatively, by means of controlling the remote control unit 41 (or the remote control unit 31) on the subsidiary carrier 21 (or the parent carrier 11), the signal transmitting/receiving unit 42 (or the signal transmitting/receiving unit 32) can emit a remote control signal wirelessly or via GPS navigation system, whereby the main power control unit 33 (or the subsidiary power control unit 43) on the parent carrier 11 (or the subsidiary carrier 21) can receive the remote control signal via the signal transmitting/receiving unit 32 (or the signal transmitting/receiving unit 42) so as to remotely control the main power control unit 33 (or the subsidiary power control unit 43) to control the parent carrier 11 (or the subsidiary carrier 21) to solely run and move.

In another embodiment, the power control unit has a subsidiary power control unit 43 disposed on the subsidiary carrier 21 for controlling the moving speed and direction of the subsidiary carrier 21, whereby the subsidiary carrier 21 is self-movable. The remote control unit 31 is disposed on the parent carrier 11 for transmitting/receiving remote control signals to remotely control the subsidiary power control unit 43. In this case, the parent carrier 11 can remotely control the move of the subsidiary carrier 21.

It should be noted that the subsidiary carrier 21 can be separated from the parent carrier 11 to solely run and move. Also, in the condition that the parent carrier 11 is remotely controlled, the subsidiary carrier 21 can follow the parent carrier 11 to move by its own power.

Figure 4:
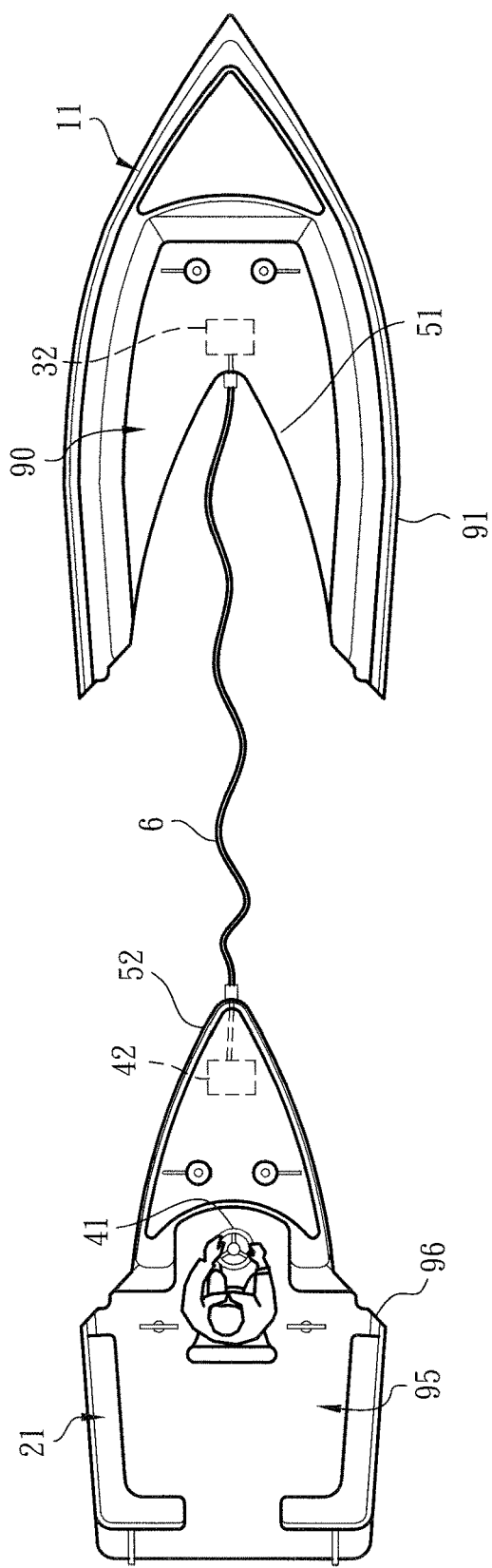
FIG. 4 is a top view of the first embodiment of the present invention according to FIG. 1, showing another using state thereof.

Please now refer to FIG. 4. In a modified embodiment, the parent carrier 11 is connected to the subsidiary carrier 21 via a dragging member 6 for dragging the subsidiary carrier 21. The dragging member 6 can be a cable. In addition, the signal transmitting/receiving unit 42 of the subsidiary carrier 21 and the signal transmitting/receiving unit 32 of the parent carrier 11 can be connected with each other by an electrical wire coaxial with the dragging member 6. In this case, the signal transmitting/receiving unit 42 of the subsidiary carrier 21 can transmit the remote control signals to the signal transmitting/receiving unit 32 of the parent carrier 11 in a wired manner. Accordingly, in the condition that the subsidiary carrier 21 is separated from the parent carrier 11, the subsidiary carrier 21 can be dragged by the parent carrier 11 to move along with the parent carrier 11.

Figure 5:
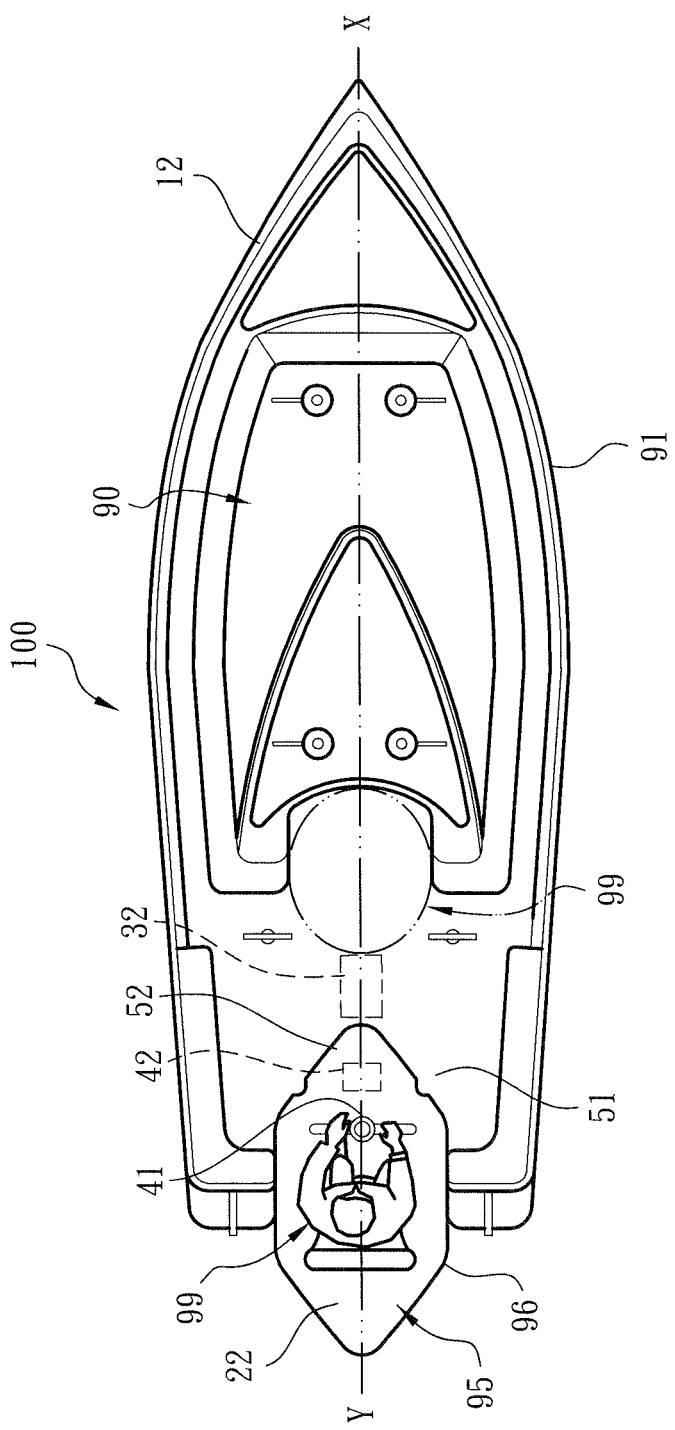
FIG. 5 is a top view of the first embodiment of the present invention according to FIG. 1 in another aspect.
Figure 6:
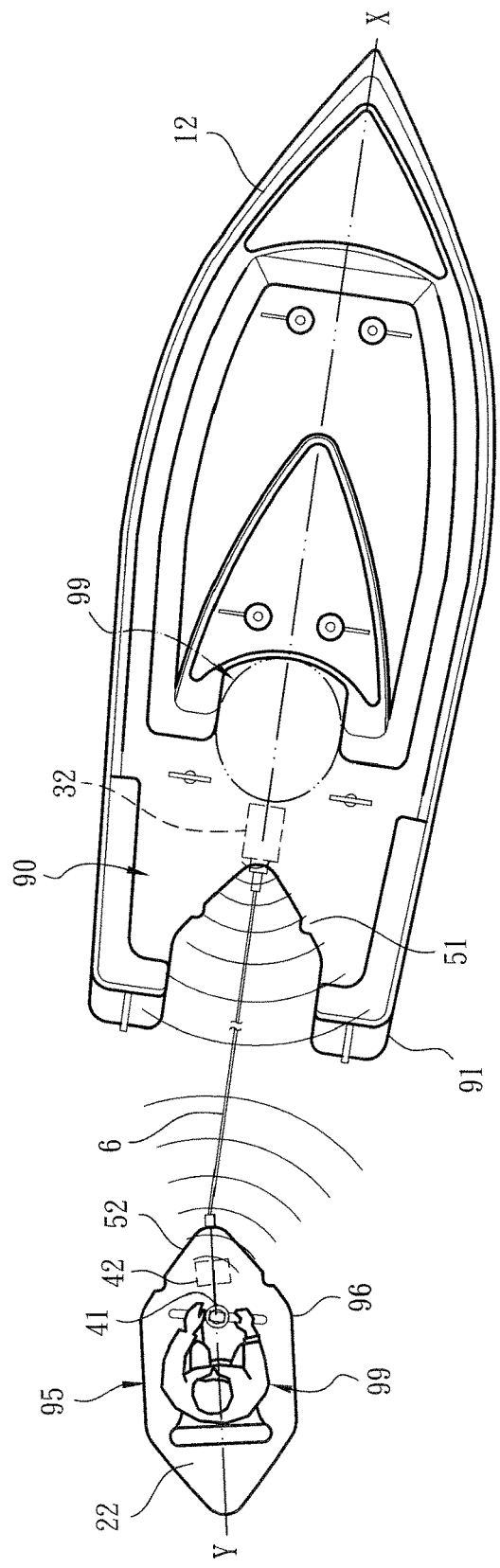
FIG. 6 is a top view according to FIG. 5, showing the using state thereof.

Please refer to FIGS. 5 and 6. In another embodiment, the parent carrier 12 is a speedboat, while the subsidiary carrier 22 is a jet ski. The parent carrier 12 and the subsidiary carrier 22 can be connected by the dragging member 6 or not. Accordingly, the parent carrier 12 and the subsidiary carrier 22 can be combined into a special and novel water-borne transportation tool. In the case that the parent carrier 12 is a speedboat, the subsidiary carrier can be an inflatable rubber boat, a glider, a drag parachute or a hot-air balloon to achieve the effect of leisure, exercise, etc.

Figure 7:
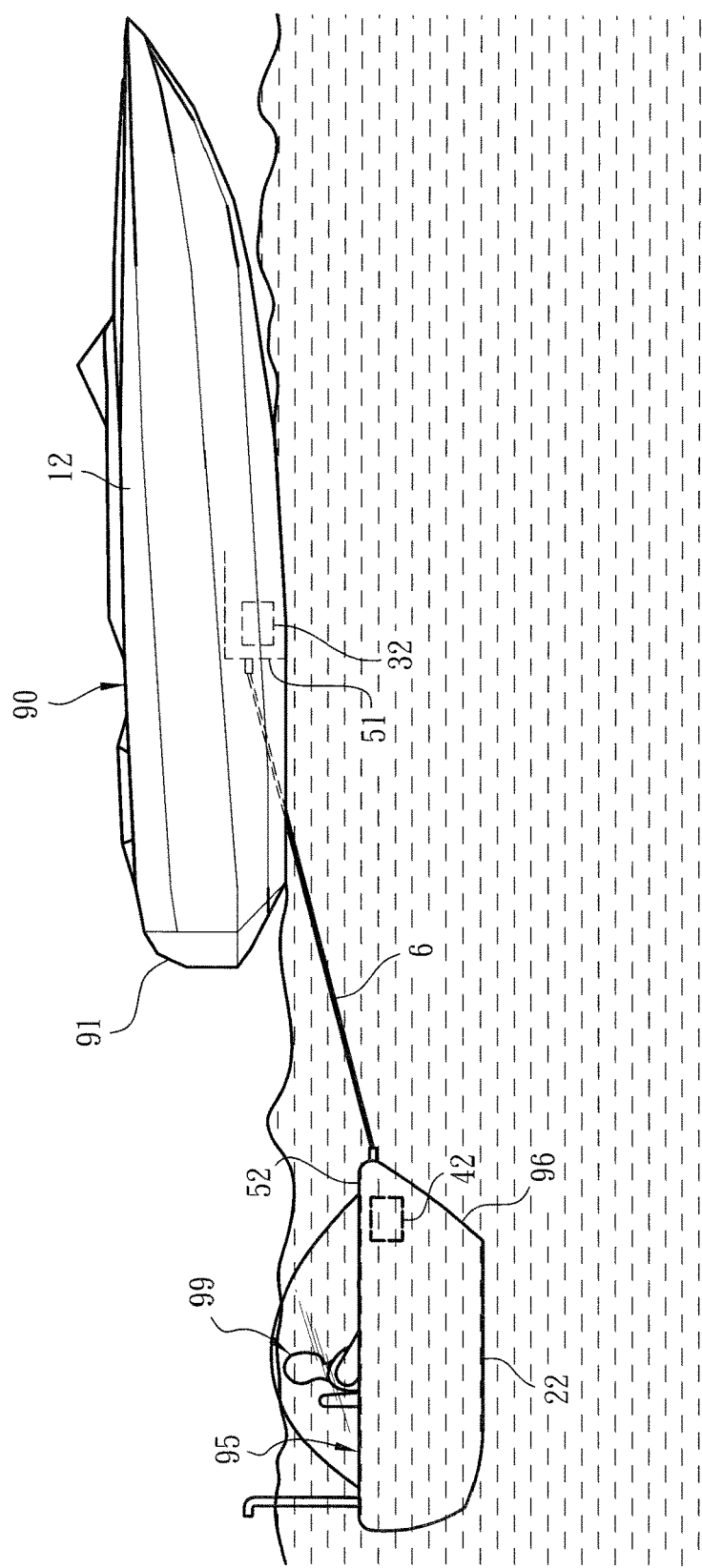
FIG. 7 is a side view of the first embodiment of the present invention according to FIG. 1 in still another aspect.

Please refer to FIG. 7. In still another embodiment, the parent carrier 12 is a speedboat, while the subsidiary carrier 22 is a submarine. The submarine can be a semi-skin-diving powerless submarine. The top of the submarine has a transparent cockpit or section 99. A dragging member 6 is connected between the parent carrier 12 and the subsidiary carrier 22 to form another special and novel water-borne transportation tool for providing afloat or underwater sightseeing effect. Accordingly, with the subsidiary carrier 22 separated from the parent carrier 12, a user can take the subsidiary carrier 22. At this time, the signal transmitting/receiving unit 42 of the subsidiary carrier 22 can transmit the remote control signals to the signal transmitting/receiving unit 32 of the parent carrier 12 in a wired or wireless manner or via GPS navigation so as to control the parent carrier 12 to drag the subsidiary carrier 22 to run in a semi-skin-diving or full-diving manner.

Figure 8:
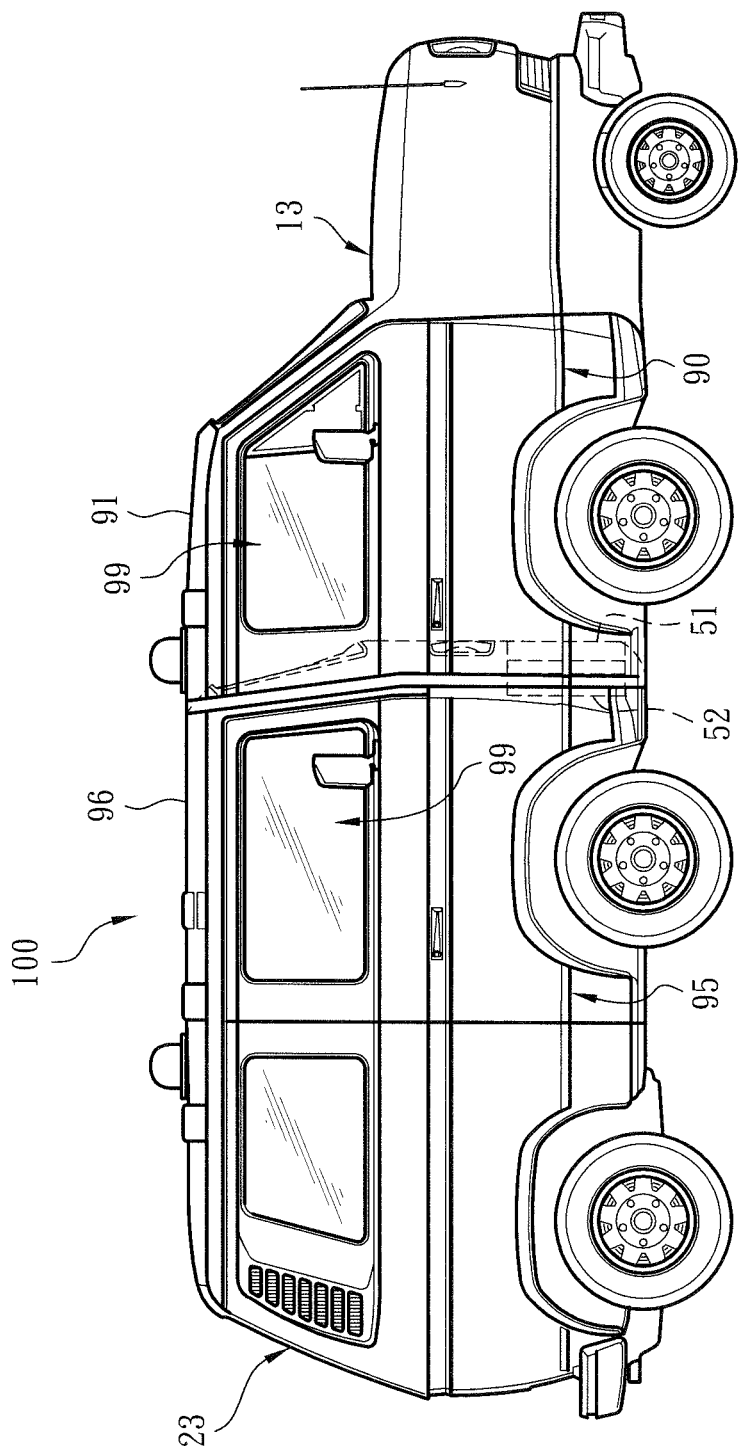
FIG. 8 is a side view of a second embodiment of the present invention.
Figure 9:
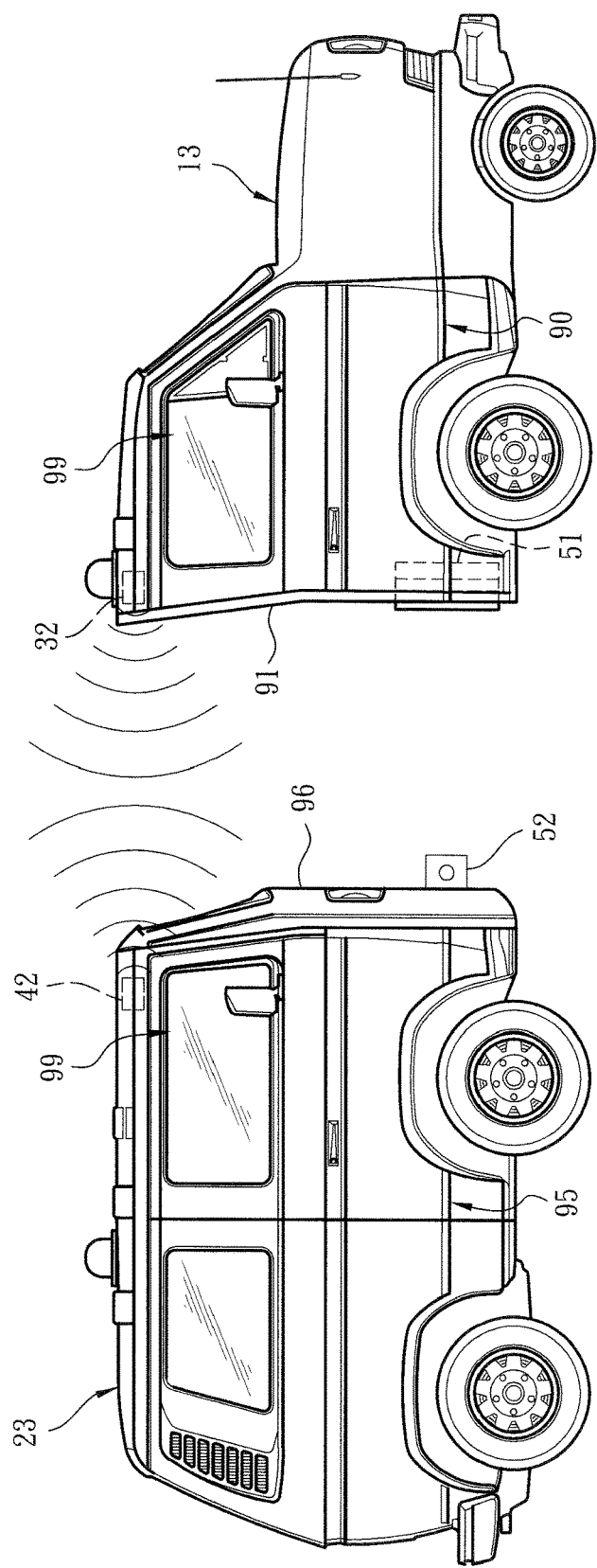
FIG. 9 is a side view of the second embodiment of the present invention according to FIG. 8, showing the using state thereof.

Please now refer to FIGS. 8 and 9, which show a second embodiment of the present invention. In the second embodiment, the parent carrier 13 and the subsidiary carrier 23 are both automobiles. The subsidiary carrier 23 can be self-movable or not self-movable. The parent carrier 13 and the subsidiary carrier 23 are assembled to form a special and novel vehicle. The first and second connection sections 51, 52 can be connected to assemble the parent carrier 13 and the subsidiary carrier 23 into an "integrated" or one single larger vehicle or assembly 100. In this case, a driver can optionally sit on the parent carrier 13 (or the subsidiary carrier 23) to drive the vehicle or assembly 100.

In the condition that the parent carrier 13 is separated from the front end of the subsidiary carrier 23, the person and/or the driver can optionally sit on the subsidiary carrier 23 (or the parent carrier 13). At this time, the driver can use the signal transmitting/receiving unit 42 (or the signal transmitting/receiving unit 32) on the subsidiary carrier 23 (or the parent carrier 13) to wirelessly transmit the remote control signals to the signal transmitting/receiving unit 32 (or the signal transmitting/receiving unit 42) on the parent carrier 13 (or the subsidiary carrier 23) so as to wirelessly remotely control the parent carrier 13 (or the subsidiary carrier 23) to solely run and move.

Figure 10:
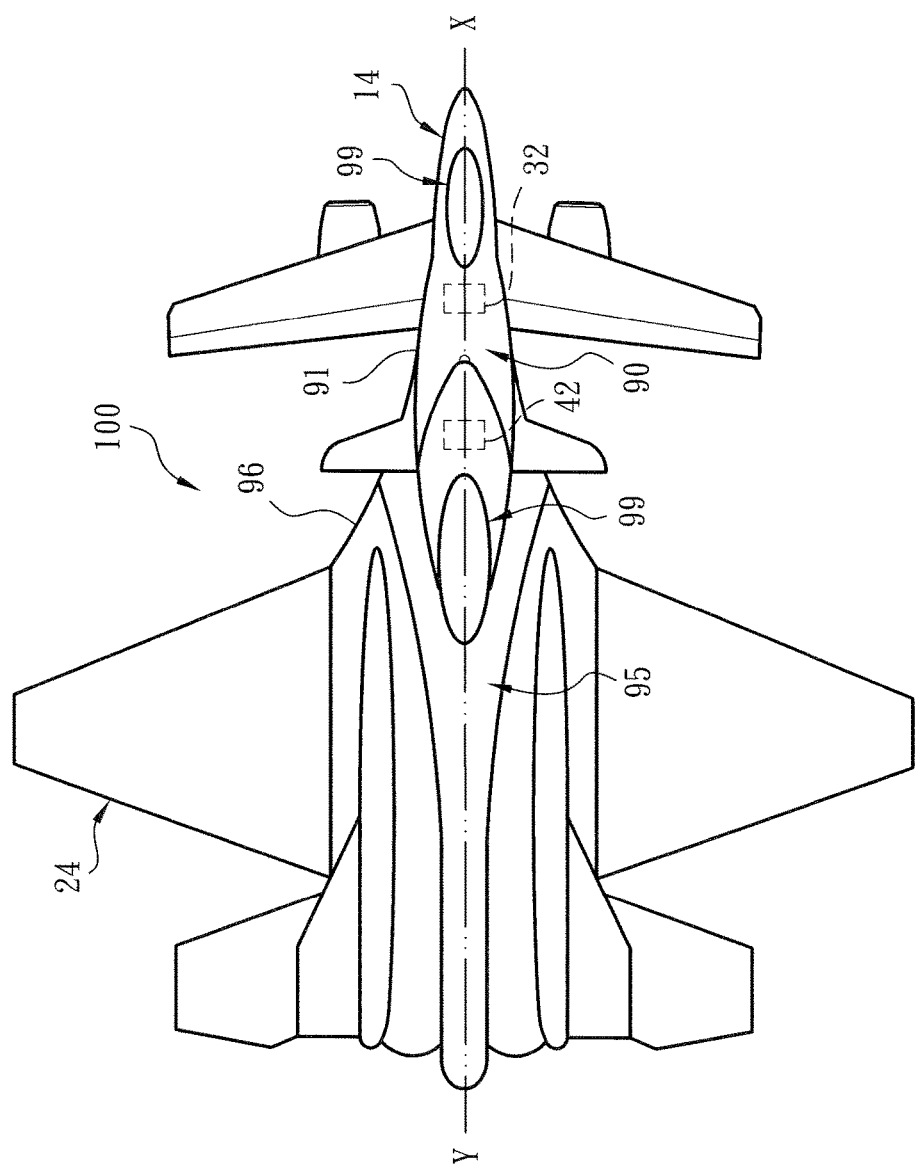
FIG. 10 is a top view of a third embodiment of the present invention.
Figure 11:
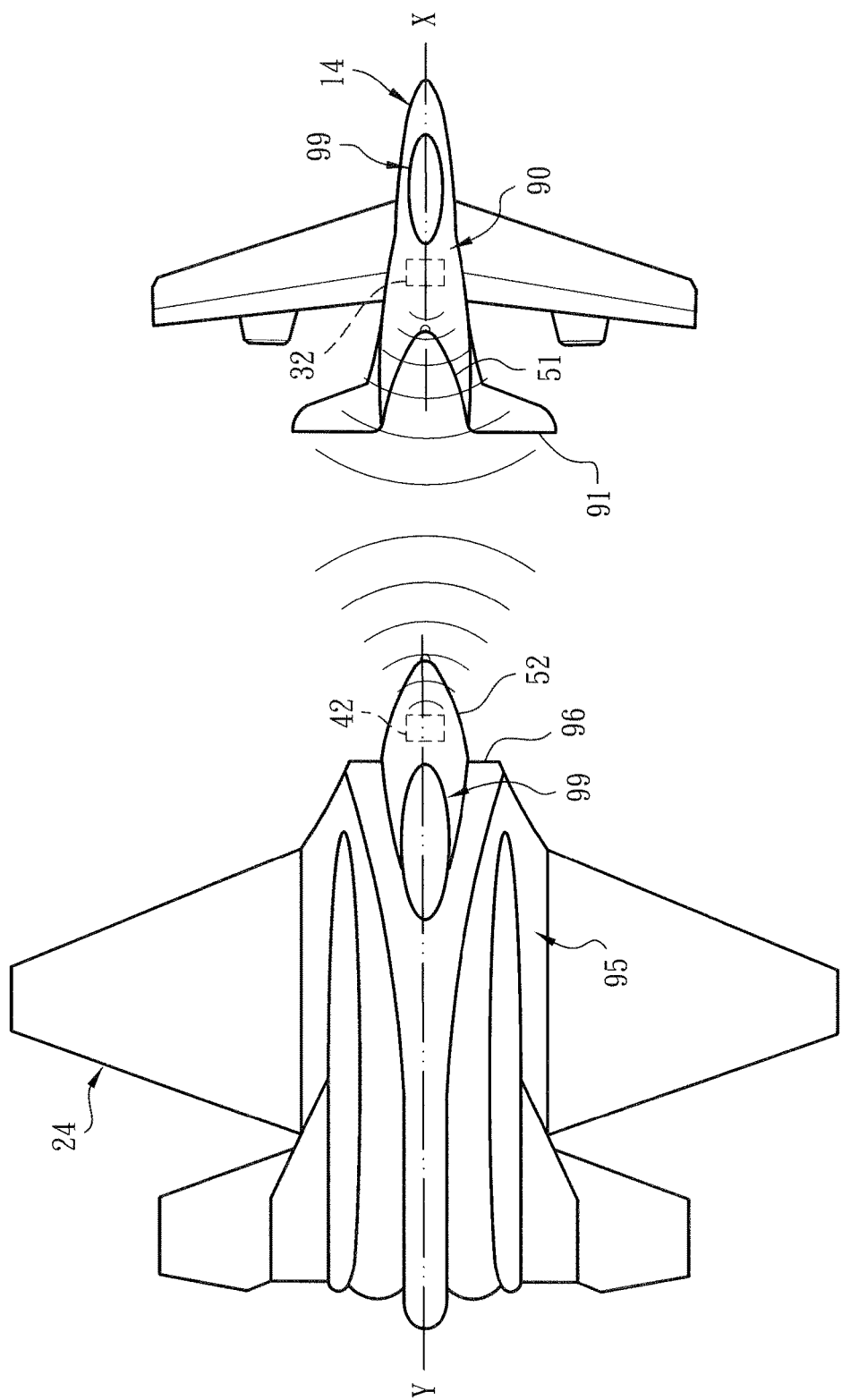
FIG. 11 is a top view of the third embodiment of the present invention according to FIG. 10, showing a using state thereof.

Please now refer to FIGS. 10 and 11, which show a third embodiment of the present invention. In the third embodiment, the parent carrier 14 and the subsidiary carrier 24 are both airplanes. Alternatively, the parent carrier 14 or the subsidiary carrier 24 is glider without self-moving ability. The parent carrier 14 and the subsidiary carrier 24 can be back and forth mated and connected with each other to form a special and novel aircraft.

When the parent carrier 14 and the subsidiary carrier 24 are assembled into an "integrated" or one single larger aircraft or assembly 100, the parent carrier 14 and the subsidiary carrier 24 can fly together. In the condition that the parent carrier 14 is separated from the subsidiary carrier 24, a driver can sit in the subsidiary carrier 24 and use the signal transmitting/receiving unit 42 on the subsidiary carrier 24 to wirelessly transmit the remote control signals to the signal transmitting/receiving unit 32 on the parent carrier 14 so as to wirelessly remotely control the parent carrier 14 to fly.

Figure 12:
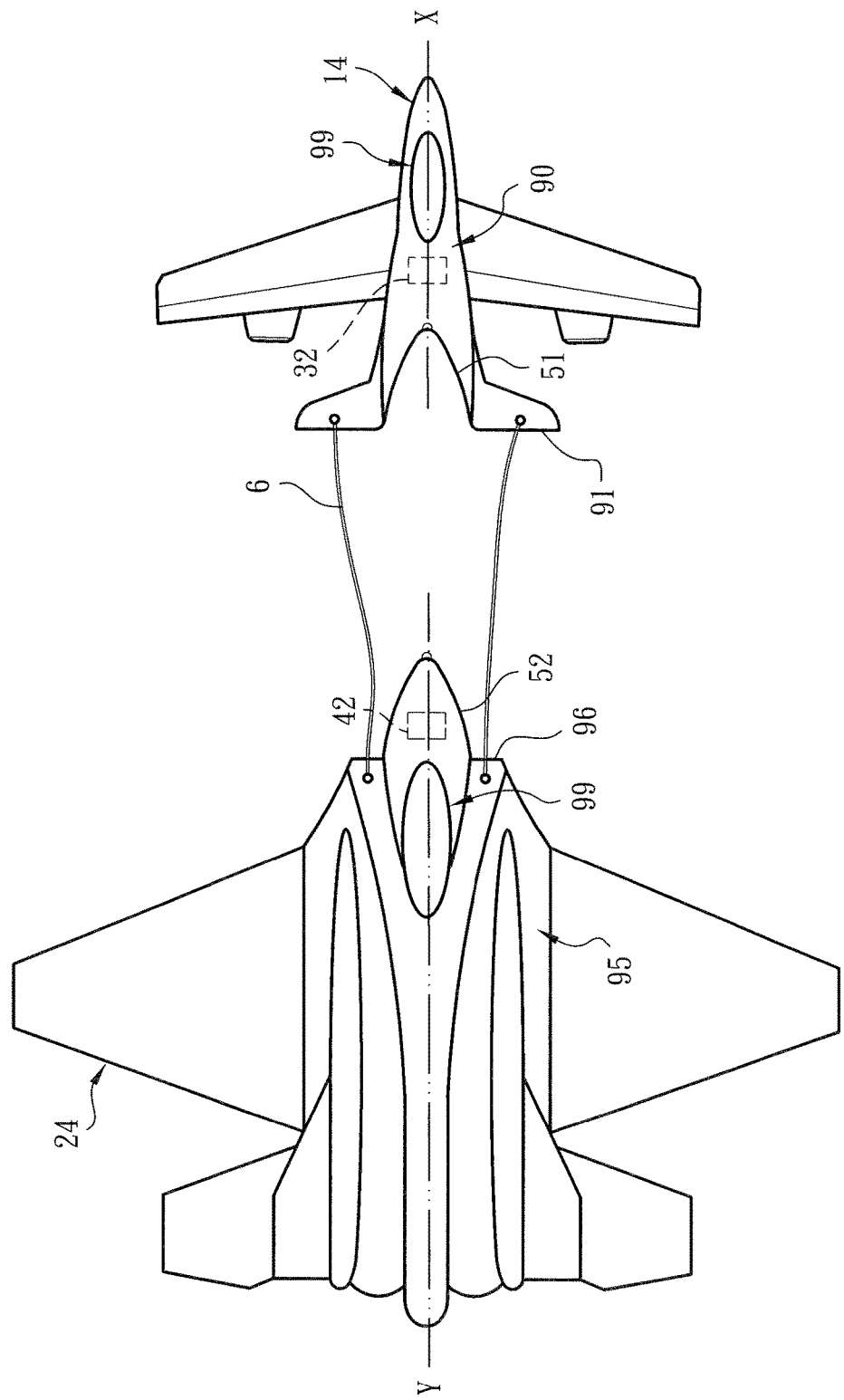
FIG. 12 is a top view of the third embodiment of the present invention according to FIG. 10, showing another using state thereof.

Please now refer to FIG. 12. In a modified embodiment, the parent carrier 14 can drag the subsidiary carrier 24 via at least one dragging member 6. In this embodiment, there are two dragging members 6. The two dragging members 6 are respectively connected to two sides of the airplane body of the parent carrier 14 and two sides of the airplane body of the subsidiary carrier 24. The signal transmitting/receiving unit 42 of the subsidiary carrier 24 and the signal transmitting/receiving unit 32 of the parent carrier 14 are also connected with each other via an electrical wire coaxial with the dragging member 6. Accordingly, the signal transmitting/receiving unit 42 of the subsidiary carrier 24 can transmit the remote control signals to the signal transmitting/receiving unit 32 of the parent carrier 14 in a wired manner. Therefore, in the condition that the subsidiary carrier 24 is separated from the parent carrier 14, the subsidiary carrier 24 can be dragged by the parent carrier 14 to move along with the parent carrier 14.

It should be noted that during the flight, when it is necessary to back and forth mate and connect the parent carrier 14 with the subsidiary carrier 24, the two dragging members 6 connected to two sides of the airplane body of the parent carrier 14 and two sides of the airplane body of the subsidiary carrier 24 can provide two-point locating effect. The dragging members 6 can be synchronously wound up to shorten the distance between the parent carrier 14 and the subsidiary carrier 24. Moreover, the dragging members 6 can together guide and correct the relative positions of two sides of the parent carrier 14 and the subsidiary carrier 24. Accordingly, during the flight, the parent carrier 14 and the subsidiary carrier 24 can be precisely back and forth mated and connected with each other.

According to the above arrangement, the transportation tool can be used in a combined mode and a separated mode. (In the combined mode, the transportation tool forms one single larger transportation tool and the passenger transportation section (or chamber) 99 of the parent carrier 11, 12, 13, 14 is in communication with or not in communication with the passenger transportation section (or chamber) 99 of the subsidiary carrier 21, 22, 23, 24). Also, the parent carrier and the subsidiary carrier can respectively run and back and forth run by dragging and remote control. In this case, the parent carrier and the subsidiary carrier can be combined or separated to carry a user and run together or run back and forth by remote control. Under such circumstance, the form and the use of the space of the transportation tool is more diversified to widen the application range of the transportation tool and enhance the convenience and utility thereof in use.

The above embodiments are only used to illustrate the present invention, not intended to limit the scope thereof.

Many modifications of the above embodiments can be made without departing from the spirit of the present invention.

What is claimed is:

1. A passenger transportation complex parent-subsidiary mobile carrier comprising:
    a parent carrier, the parent carrier being defined with at least one reference axis and having a parent carrying section and a profile line surrounding and connecting with the parent carrying section, the parent carrier including at least one first connection section disposed on the parent carrier; and
    at least one subsidiary carrier, the subsidiary carrier being defined with a central reference axis and having a subsidiary carrying section and a profile line surrounding and connecting with the subsidiary carrying section, the subsidiary carrier including a second connection section disposed on the subsidiary carrier, the second connection section being releasably mated and connected with the first connection section, at least one of the parent carrier and the subsidiary carrier being self-movable and including a power control unit capable of controlling moving speed and direction, at least one of the parent carrier and the subsidiary carrier having a passenger transportation section, whereby when the first connection section is mated and connected with or released from the second connection section, the reference axis of the parent carrier is aligned with and connected with the central reference axis of the subsidiary carrier so that at least a part of the profile line of the parent carrier is mated and connected with at least a part of the profile line of the subsidiary carrier, whereby at least a part of the parent carrying section and at least a part of the subsidiary carrying section are mated and connected with each other and positioned on the same plane so that the parent carrier and the subsidiary carrier are connected to together form the complex carrier as an integrated assembly to move together or separated from each other.

2. The passenger transportation complex parent-subsidiary mobile carrier as claimed in claim 1, wherein the reference axis of the parent carrier is positioned in a central section of the parent carrier, whereby a central section of the first connection section is positioned on the reference axis, a central section of the second connection section being positioned on the central reference axis, the reference axis of the parent carrier being connected with the central reference axis of the subsidiary carrier, whereby the area of the connected parent carrying section and the subsidiary carrying section on the same plane is larger than the area of the parent carrying section and the area of the parent carrying section is larger than, equal to or smaller than the area of the subsidiary carrying section.

3. The passenger transportation complex parent-subsidiary mobile carrier as claimed in claim 1, wherein the power control unit includes a main power control unit disposed on the parent carrier for controlling the moving speed and direction of the parent carrier, a remote control unit being disposed on the subsidiary carrier for transmitting/receiving remote control signals to remotely control the main power control unit, the power control unit and the remote control unit being respectively electrically connected to signal transmitting/receiving units.

4. The passenger transportation complex parent-subsidiary mobile carrier as claimed in claim 2, wherein the power control unit includes a main power control unit disposed on the parent carrier for controlling the moving speed and direction of the parent carrier, a remote control unit being disposed on the subsidiary carrier for transmitting/receiving remote control signals to remotely control the main power control unit, the power control unit and the remote control unit being respectively electrically connected to signal transmitting/receiving units.

5. The passenger transportation complex parent-subsidiary mobile carrier as claimed in claim 1, wherein the power control unit includes a subsidiary power control unit disposed on the subsidiary carrier for controlling the moving speed and direction of the subsidiary carrier, a remote control unit being disposed on the parent carrier for transmitting/receiving remote control signals to remotely control the subsidiary power control unit, the power control unit and the remote control unit being respectively electrically connected to signal transmitting/receiving units.

6. The passenger transportation complex parent-subsidiary mobile carrier as claimed in claim 2, wherein the power control unit includes a subsidiary power control unit disposed on the subsidiary carrier for controlling the moving speed and direction of the subsidiary carrier, a remote control unit being disposed on the parent carrier for transmitting/receiving remote control signals to remotely control the subsidiary power control unit, the power control unit and the remote control unit being respectively electrically connected to signal transmitting/receiving units.

7. The passenger transportation complex parent-subsidiary mobile carrier as claimed in claim 1, wherein the passenger transportation section of the parent carrier is in communication with or not in communication with the passenger transportation section of the subsidiary carrier, the first connection section being connectable with the profile line of the parent carrier, the second connection section being connectable with the profile line of the subsidiary carrier.

8. The passenger transportation complex parent-subsidiary mobile carrier as claimed in claim 2, wherein the passenger transportation section of the parent carrier is in communication with or not in communication with the passenger transportation section of the subsidiary carrier, the first connection section being connectable with the profile line of the parent carrier, the second connection section being connectable with the profile line of the subsidiary carrier.

9. The passenger transportation complex parent-subsidiary mobile carrier as claimed in claim 3, wherein the passenger transportation section of the parent carrier is in communication with or not in communication with the passenger transportation section of the subsidiary carrier, the first connection section being connectable with the profile line of the parent carrier, the second connection section being connectable with the profile line of the subsidiary carrier.

10. The passenger transportation complex parent-subsidiary mobile carrier as claimed in claim 4, wherein the passenger transportation section of the parent carrier is in communication with or not in communication with the passenger transportation section of the subsidiary carrier, the first connection section being connectable with the profile line of the parent carrier, the second connection section being connectable with the profile line of the subsidiary carrier.

11. The passenger transportation complex parent-subsidiary mobile carrier as claimed in claim 5, wherein the passenger transportation section of the parent carrier is in communication with or not in communication with the passenger transportation section of the subsidiary carrier, the first connection section being connectable with the profile line of the parent carrier, the second connection section being connectable with the profile line of the subsidiary carrier.

12. The passenger transportation complex parent-subsidiary mobile carrier as claimed in claim 6, wherein the passenger transportation section of the parent carrier is in communication with or not in communication with the passenger transportation section of the subsidiary carrier, the first connection section being connectable with the profile line of the parent carrier, the second connection section being connectable with the profile line of the subsidiary carrier.

13. The passenger transportation complex parent-subsidiary mobile carrier as claimed in claim 3, wherein the signal transmitting/receiving units serve to transmit/receive the remote control signals by means of at least one of wired, wireless and GPS navigation systems.

14. The passenger transportation complex parent-subsidiary mobile carrier as claimed in claim 5, wherein the signal transmitting/receiving units serve to transmit/receive the remote control signals by means of at least one of wired, wireless and GPS navigation systems.

15. The passenger transportation complex parent-subsidiary mobile carrier as claimed in claim 1, wherein the parent carrier is connected to the subsidiary carrier via a dragging member for dragging the subsidiary carrier.

16. The passenger transportation complex parent-subsidiary mobile carrier as claimed in claim 2, wherein the parent carrier is connected to the subsidiary carrier via a dragging member for dragging the subsidiary carrier.

17. The passenger transportation complex parent-subsidiary mobile carrier as claimed in claim 3, wherein the parent carrier is connected to the subsidiary carrier via a dragging member for dragging the subsidiary carrier.

18. The passenger transportation complex parent-subsidiary mobile carrier as claimed in claim 4, wherein the parent carrier is connected to the subsidiary carrier via a dragging member for dragging the subsidiary carrier.

19. The passenger transportation complex parent-subsidiary mobile carrier as claimed in claim 5, wherein the parent carrier is connected to the subsidiary carrier via a dragging member for dragging the subsidiary carrier.

20. The passenger transportation complex parent-subsidiary mobile carrier as claimed in claim 6, wherein the parent carrier is connected to the subsidiary carrier via a dragging member for dragging the subsidiary carrier.

* * * * *